United States Patent [19]

Hashimoto

[11] 3,797,031

[45] Mar. 12, 1974

[54] MAGNETIC HEAD ASSEMBLY WITH SHIELD MEANS FOR CONTROLLED CROSS-TALK FLUX

[75] Inventor: Yoshinori Hashimoto, Tokyo, Japan

[73] Assignee: Teac Corporation, Tokyo, Japan

[22] Filed: June 1, 1972

[21] Appl. No.: 258,525

[30] Foreign Application Priority Data

June 5, 1971 Japan ................................ 46-39632
June 5, 1971 Japan ................................ 46-39633

[52] U.S. Cl. .................................... 360/121, 360/124
[51] Int. Cl. ........................... G11b 5/26, G11b 5/20
[58] Field of Search .............. 179/100.2 C, 100.2 K; 340/174.1 F; 346/74 MC

[56] References Cited

UNITED STATES PATENTS

| | | | |
|---|---|---|---|
| 3,165,592 | 1/1965 | Brette | 179/100.2 C |
| 3,414,971 | 12/1968 | Boehme | 340/174.1 F |
| 3,529,349 | 9/1970 | Van De Schoot et al. | 179/100.2 C |

*Primary Examiner*—Bernard Konick
*Assistant Examiner*—Robert S. Tupper
*Attorney, Agent, or Firm*—Marshall & Yeasting

[57] ABSTRACT

A recording and reproducing magnetic head assembly comprising a recording magnetic head for recording an information signal on a magnetic medium, a reproducing magnetic head for reproducing therefrom the information signal recorded thereon by the recording magnetic head, and at least one magnetic plate, in which each of the recording and reproducing magnetic heads has a magnetic core assembly consisting of I-shaped and C-shaped magnetic core members forming an effective gap therebetween and windings on said members including first and second windings wound on the I-shaped and C-shaped core members respectively of the reproducing head; the recording and reproducing magnetic heads are disposed close to each other with the I-shaped magnetic core member of the recording magnetic head being adjacent the I-shaped magnetic core member of the reproducing magnetic head; the magnetic plate is disposed to extend from the front of the C-shaped magnetic core member of the recording magnetic head to the I-shaped magnetic core member only of the reproducing magnetic head for passing therethrough unnecessary leakage fluxes from the recording magnetic head to the reproducing magnetic head; and the first and second windings of the reproducing magnetic head are connected in series with each other with a polarity and a number of turns such that outputs produced therein based on the information signal recorded on the magnetic medium may be added to each other but that outputs produced therein based on the unnecessary leakage fluxes from the recording magnetic head may be cancelled by each other.

3 Claims, 4 Drawing Figures

MAGNETIC HEAD ASSEMBLY WITH SHIELD MEANS FOR CONTROLLED CROSS-TALK FLUX

BACKGROUND OF THE INVENTION

1. Field of the Invention

This invention relates to a recording and reproducing magnetic head assembly which consists of a recording magnetic head for recording an information signal on a magnetic medium and a reproducing magnetic head for reproducing therefrom the information signal recorded by the recording magnetic head thereon.

2. Description of the Prior Art

It is desired to monitor whether an information signal being recorded by a recording magnetic head on a magnetic medium such as a magnetic tape or magnetic drum is correctly recorded without any dropout or whether the information signal being recorded is a correct signal to be recorded. To perform this, it has been the practice in the art that the signal recorded by the recording magnetic head on the magnetic medium is reproduced by the reproducing magnetic head to provide a reproduced signal for monitoring. In this case, it is desirable to dispose the reproducing magnetic head as close to the recording magnetic head as possible so as promptly to obtain the result of the monitoring. With the reproducing magnetic head being disposed in close proximity to the recording head, however, the former is subject to an influence of unnecessary leakage flux from the latter to make correct monitoring impossible. To avoid this, in the prior art, a magnetic shield plate is interposed between the recording magnetic head and the reproducing magnetic head. Only with such a magnetic shield plate, however, it is impossible sufficiently to avoid the influence of the leakage flux. This is because of the fact that the leakage flux emanates from the upper and lower front areas of the recording magnetic head forwardly thereof and enters the reproducing magnetic head from its upper and lower front areas.

SUMMARY OF THE INVENTION

Accordingly, the present invention has for its object to provide a novel recording and reproducing magnetic head assembly which consists of recording and reproducing magnetic heads disposed close to each other and which is adapted so that a signal recorded by the recording magnetic head on a magnetic medium is reproduced by the reproducing magnetic head without any influence of leakage flux emanating from the recording magnetic head.

DESCRIPTION OF THE PREFERRED EMBODIMENTS

Figure 1:
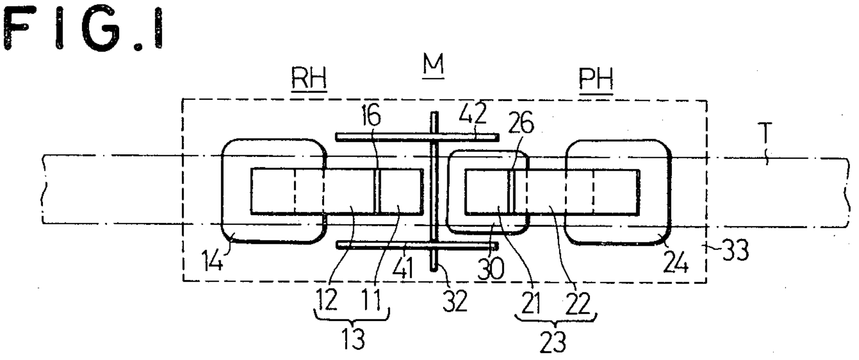
FIG. 1 is a front view schematically showing one example of a magnetic head assembly produced according to this invention.
Figure 2:
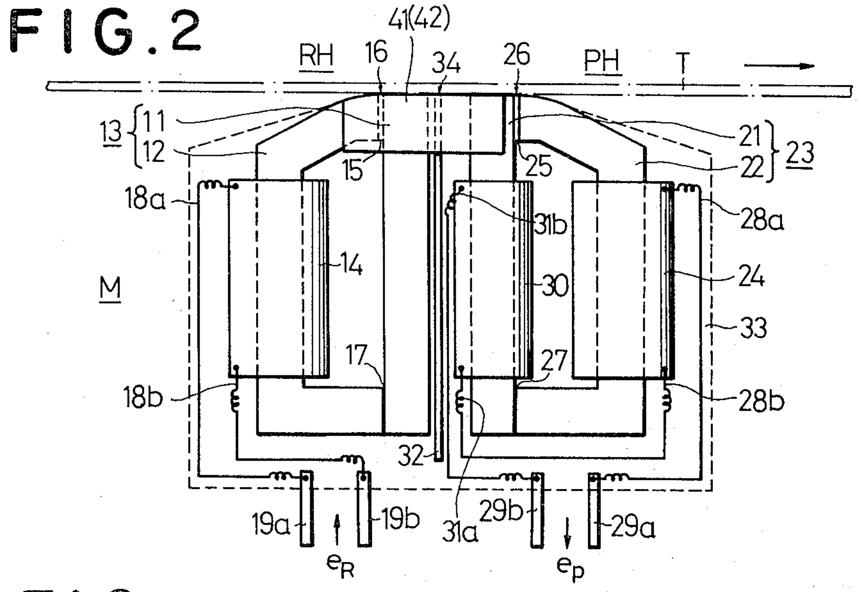
FIG. 2 is its plan view.

In FIGS. 1 and 2 reference character M indicates generally a recording and reproducing magnetic head assembly produced according to this invention. The magnetic head assembly M consists of a recording magnetic head RH and a reproducing magnetic head PH which are disposed close to each other.

The recording head RH comprises a magnetic core assembly 13 including an I-shaped magnetic core member 11 and a C-shaped magnetic core member 12 and a winding 14 coiled around the core member 12. The front end face of the core member 12 faces one side of the front portion of the core member 11 through a spacer 15 to define a front magnetic gap 16 therebetween. The rear end face of the core member 12 makes contact with one side of the rear portion of the core member 11 to define a rear gap 17 therebetween. Both ends **18*a* and 18*b* of the winding 14 are connected to input terminals 19*a* and 19*b*** respectively.

The reproducing head PH similarly comprises a magnetic core assembly 23 including an I-shaped magnetic core member 21 and a C-shaped magnetic core member 22 and a winding 24 coiled around the core member 22 and, in addition, a winding 30 wound on the core member 21. The front end face of the core member 22 faces one side of the front portion of the core member 21 through a spacer 25 to define a front magnetic gap 26 therebetween. The rear end face of the core member 22 makes contact with one side of the rear portion of the core member 21 to define a rear gap 27 therebetween. The one end **28*a* of the winding 24 is connected to an output terminal 29*a* and the other 28*b* is connected to the one end 31*a* of the winding 30, the other end 31*b* of which is, in turn, connected to an output terminal 29*b*.**

The recording magnetic head RH and the reproducing one PH are disposed as close to each other as possible with the core member 11 of the core assembly 13 of the former being positioned on the side of the latter and the core member 21 of the core assembly 23 of the latter on the side of the former, a magnetic shield plate 32 being interposed therebetween. The magnetic plates 41 and 42 are disposed to extend from the upper and lower portions of the front of the core member 12 of the recording head RH to the upper and lower portions of the front of the core member 21 of the reproducing head PH. In this case, it must be noted that the free ends of the magnetic plates 41 and 42 on the side of the reproducing head PH extend over the core member 21 of the reproducing head PH to the core member 22. The recording and reproducing magnetic heads RH and PH, the magnetic shield plate 32, the input terminals **19*a* and 19*b* and the output terminals 29*a* and 29*b* are disposed and assembled together in a holder or case 33, generally indicated by a broken line, with a tape contact surface 34 being exposed with which a travelling magnetic tape T indicated by a chain line makes contact from a position on the front of the recording head RH a little apart from the gap 16 on the opposite side from the reproducing head PH to a position on the front of the reproducing head PH a little apart from the gap 26** on the opposite side from the recording head RH.

The polarity and numbers of turns of the windings 24 and 30 of the reproducing head PH are selected as described hereinbelow.

Figure 3:
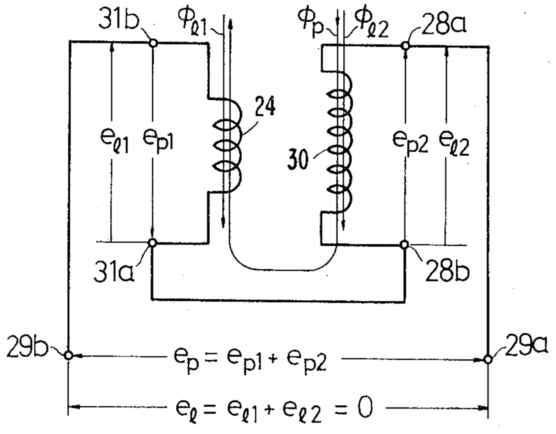
FIG. 3 is an electrical connection diagram of a reproducing head employed in the magnetic head assembly depicted in FIG. 1; add

In the event that an information signal $e_R$ is supplied through the input terminals **19*a* and 19*b* to the winding 14 of the recording head RH, an effective leakage flux corresponding to the information signal $e_R$ emanates from the gap 16 of the recording head RH forwardly thereof to act on the travelling magnetic tape T to record the information signal $e_R$ thereon magnetically. At the same time, an unnecessary leakage flux emanates from the upper and lower areas of the front of the recording head RH forwardly thereof and enters the upper and lower areas of the fronts of the core members 21 and 22 of the reproducing head PH through the magnetic plates 41 and 42 and flows therein as unnecessary leakage fluxes $\phi_{l1}$ and $\phi_{l2}$ toward their rear end portions as shown in FIG. 3, providing an output $e_{l2}$ between the both ends 28$a$ and 28$b$ of the winding 24 based on the flux $\phi_{l2}$ and an output $e_{l1}$ between the both ends 31$a$ and 31$b$ of the winding 30 based on the flux $\phi_{l1}$. Further, when the magnetic tape T having recorded thereon the information signal $e_R$ has reached the position of the reproducing head PH, an effective leakage flux from the magnetic tape T enters as $\phi_p$ thereinto from the gap 26 and flows in the core member 22, the rear gap 27 and the core member 21 in this order as illustrated (or in an order opposite thereto), providing outputs $e_{p1}$ and $e_{p2}$ between the both ends 28$a$ and 28$b$ of the winding 24 and between those 31$a$ and 31$b$ of the winding 30** respectively based on the flux $\phi_p$.

Therefore, the polarities of the windings 24 and 30 are selected so that the outputs $e_{p1}$ and $e_{p2}$ may be added to each other. Namely, when the windings 24 and 30 are the same in the direction of turn, the one end 28$a$ of the winding 24 is used as a winding start and the other 28$b$ a winding end and the one end 31$a$ of the winding 30 is used as a winding start and the other 31$b$ a winding end. In such a case, the outputs $e_{p1}$ and $e_{p2}$ of the polarities indicated by arrows in FIG. 3 are obtained in the windings 24 and 30 based on the effective leakage flux $\phi_p$, the output $e_p$ given by the following equation (1) is produced between the output terminals 29$a$ and 29$b$ based on the effective leakage flux $\phi_p$.

$$e_p = e_{p1} + e_{p2} \ldots \quad (1)$$

In this case, if the numbers of turns of the windings 30 and 24 are taken as $N_1$ and $N_2$ respectively.

$$\left.\begin{aligned} e_{p1} &= k \cdot N_1 \cdot \phi_p \\ e_{p2} &= k \cdot N_2 \cdot \phi_p \end{aligned}\right\} \quad (2)$$

Accordingly, the equation (1) is expressed by the following equation (3).

$$e_p = k \cdot \phi_p (N_1 + N_2) \ldots \quad (3)$$

However, the unnecessary outputs $e_{l1}$ and $e_{l2}$ of the polarities indicated by arrows in FIG. 3 are produced in the windings 30 and 24 based on the unnecessary leakage fluxes $\phi_{l1}$ and $\phi_{l2}$ respectively, so that an unnecessary output $e_l$ given by the following equation (4) is provided between the output terminals 29$a$ and 29$b$.

$$\begin{aligned} e_l &= e_{l1} \sim e_{l2} \\ &= k \cdot N_1 \cdot \phi_{l1} \sim k \cdot N_2 \cdot \phi_{l2} \\ &= k(N_1 \cdot \phi_{l1} \sim N_2 \cdot \phi_{l2}) \ldots \end{aligned} \quad (4)$$

Accordingly, the numbers of turns $N_1$ and $N_2$ of the windings 30 and 24 are selected to bear a relationship given by the following equation (5) so that the unnecessary output $e_l$ may be reduced to zero.

$$\left.\begin{aligned} N_1 \cdot \phi_{l1} &= N_2 \cdot \phi_{l2} \\ (N_1/N_2) &= (\phi_{l2}/\phi_{l1}) \end{aligned}\right\} \quad (5)$$

In this case, since the core member 21 is located more close to the recording head RH than the core member 22, and the magnetic plates 41 and 42 extend only to the upper and lower portion of the front of the core member 21 of the reproducing head PH the unnecessary leakage fluxes $\phi_{l1}$ and $\phi_{l2}$ bear a relationship $\phi_{l1} > \phi_{l2}$ in practice, and consequently the windings 30 and 24 bear a relationship $N_1 < N_2$. In such a case, the unnecessary output $e_l$ is zero, so that no output is reproduced between the terminals 29$a$ and 29$b$ of the reproducing head PH based on the unnecessary leakage fluxes $\phi_{l1}$ and $\phi_{l2}$ flowing in the core members 21 and 22 of the reproducing head PH from the recording head RH.

With the construction of the embodiment of the present invention above described in connection with FIGS. 1 and 2, an information signal being recorded by the recording head RH on the travelling magnetic tape T can be immediately reproduced therefrom by the reproducing head PH. In this case, even if the recording and reproducing heads RH and PH are disposed as extremely close to each other as possible, there is no possibility that the reproducing head PH is adversely affected by an unnecessary flux emanating from the recording head RH. Consequently, it is possible correctly to monitor based on the output from the reproducing head PH whether an information signal is being recorded on a magnetic tape without any dropout or whether the signal being recorded is a correct one to be recorded. Since the free ends of the magnetic plates 41 and 42 extend only to the position opposite the core member 21 of the reproducing head PH, the number of turns of the winding 30 of the reproducing head PH on the side of the recording head RH is greatly reduced, and consequently the thickness of the winding 30 is also greatly reduced. Therefore, the reproducing head PH can be disposed closer to the recording head RH and the head assembly can be reduced in size as a whole but the influence of the unnecessary flux from the recording head can be effectively avoided.

Figure 4:
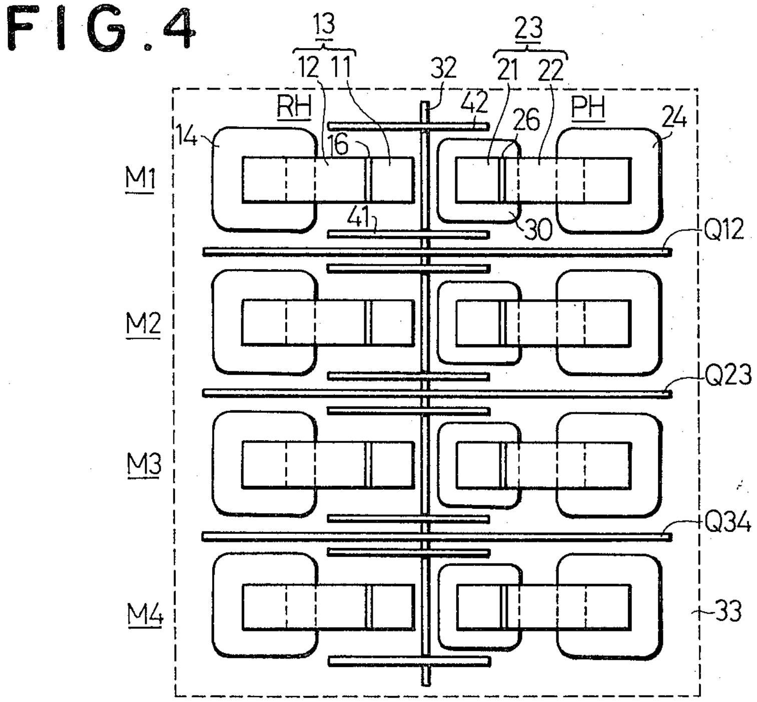
FIG. 4 is a front view schematically showing one example of a 4-channel magnetic head assembly produced according to this invention.

FIG. 4 illustrates a 4-channel magnetic head assembly employing four magnetic head assemblies M1, M2, M3 and M4 which are identical in construction with that above described in connection with FIGS. 1 and 2, which are placed one on another. In the figure, parts corresponding to those in FIGS. 4 and 5 are designated by the same reference numerals and characters and no detailed description will be repeated. In the present example, magnetic shield plates Q12, Q23 and Q24 are disposed between the magnetic head assemblies M1 and M2, between M2 and M3 and between M3 and M4 respectively. Also in this example, the same results as those in the example of FIGS. 1 and 2 can be obtained in connection with each of the magnetic head assemblies M1 to M4.

It will be apparent that many modifications and variations may be effected without departing from the scope of the novel concepts of this invention.

I claim as my invention:

1. A recording and reproducing magnetic head assembly for one track of a recording medium comprising a recording head; a reproducing head; and a magnetic plate; said recording head comprising a C-shaped core member having a winding, and an I-shaped core member spanning the open side of the C-shaped member and separated therefrom to form a gap; said reproducing head comprising a C-shaped core member having a first reproducing winding and an I-shaped core member having a second reproducing winding and spanning the open side of the C-shaped core member and separated therefrom to form a gap; said heads being mounted close to each other with the I-shaped core members adjacent each other, magnetic shield means separating said I shaped core members, said magnetic plate being mounted adjacent the gap forming parts of the recording head core members and extending into partial overlapping relation to the I-shaped core member only of said reproducing head, said first and second reproducing windings being connected in series and having numbers of turns inversely proportioned to the leakage flux of the recorder head threading therethrough whereby voltage generated by the leakage flux is minimized, said magnetic plate serving to concentrate the recorder leakage flux in the I-shaped reproducer core member, whereby the required number of turns in said second reproducing winding is reduced to permit a reduction in spacing between said heads.

2. In a recording and reproducing magnetic head according to claim 1, in which said shield means comprises a shield plate between said I-shaped recorder and reproducing.

3. In a recording and reproducing magnetic head assembly according to claim 1, a second magnetic plate mounted adjacent the recording head on the side opposite said magnetic plate, and a shield plate mounted between said magnetic head assembly and another such assembly positioned adjacent thereto.

* * * * *